United States Patent [19]
Fairbank

[11] 3,832,023
[45] Aug. 27, 1974

[54] BALL-BEARING RETAINERS

[75] Inventor: Winthrop H. Fairbank, Sudbury, Mass.

[73] Assignee: Northrop Corporation, Los Angeles, Calif.

[22] Filed: Feb. 7, 1973

[21] Appl. No.: 330,224

[52] U.S. Cl. ............................................. 308/201
[51] Int. Cl. ........................................... F16c 33/38
[58] Field of Search ................................... 308/201

[56] References Cited
UNITED STATES PATENTS

| | | | |
|---|---|---|---|
| 3,510,185 | 5/1970 | McKee | 308/201 |
| 3,649,093 | 3/1972 | Muratore | 308/201 |

*Primary Examiner*—Charles J. Myhre
*Assistant Examiner*—Frank Susko
*Attorney, Agent, or Firm*—Kenway & Jenney

[57] ABSTRACT

A ball-bearing retainer for suppressing gross oscillations of the retainer, balls, and raceways of high speed bearings. The retainer has a generally cylindrical shape and has a plurality of ball pockets. It is designed for insertion between two relatively rotating members which have confronting coaxial cylindrical surfaces. These surfaces may be formed integrally with the rotating members themselves or may be raceways placed between the rotating members for accommodating the balls held in the retainer. Formed upon a surface of the retainer and extending toward one or the other of the relatively rotating members is a plurality of lands or portions extending radially from the retainer. The lands are three in number symmetrically disposed about the inner or outer peripheral walls of the retainer. The centers of the lands are a nominal 120° apart and each land subtends an angle of 30° or less. Clearence between the surface of the lands and the confronting surface of one of the rotating members is typically of the order of tens of thousandths of an inch.

6 Claims, 4 Drawing Figures

PATENTED AUG 27 1974　　　　　　　　　　　　　　　　3,832,023
FIG. 1
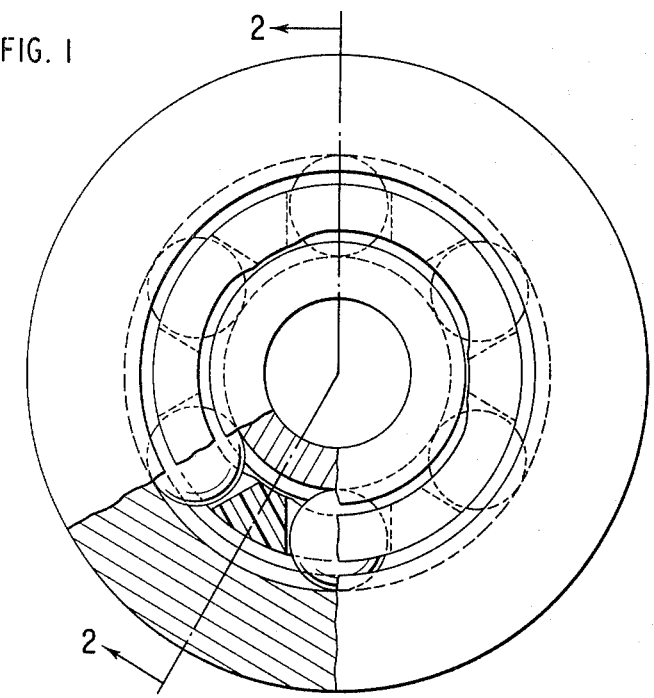
FIG. 2
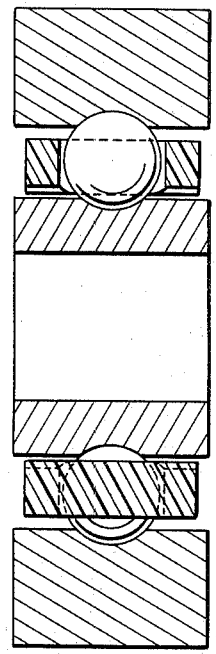
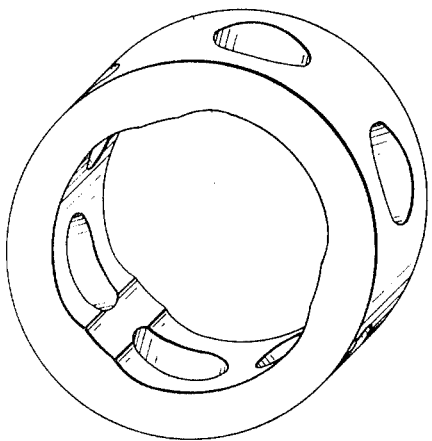
FIG. 3
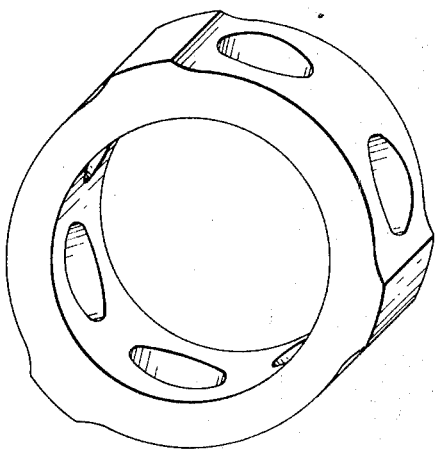
FIG. 4

3,832,023

BALL-BEARING RETAINERS

BACKGROUND OF THE INVENTION

One of the most commonly used anti-friction systems between relatively rotating members is a ball-bearing system. Basically, such systems are composed of a plurality of balls held in a generally circular array by a retainer. Retainers, sometimes referred to as cages or separators have been made in a variety of designs, all of which, however, operate in the same basic manner.

Most ball-bearing systems also include so-called inner and outer raceways, although these are at times eliminated and the balls bear directly upon the cylindrical surfaces of the relatively rotating members.

Demands for higher speed, greater precision and longer life of bearings have brought to light numerous problems which were tolerable or of no concern in the past but which cause serious difficulties in present day applications. For example, in a high-speed ball-bearing for a gyroscope momentum wheel, the problem of squeal becomes of great concern. It is not simply the noise which accompanies squealing but the consumption of energy and the violent demands on the physical integrity of the retainer, balls and raceways are totally unacceptable.

Numerous other problems also arise including eccentric vibration, cross-coupling, and general instability of the retainer. Moreover, undesirable ball group vibration and cross-coupling are also encountered. It is with the elimination or minimization of these and other problems of lesser magnitude that the present invention is concerned.

GENERAL DESCRIPTION OF THE INVENTION

Essentially, the present invention contemplates the reduction of the amount of clearance between a ball-bearing retainer and its reference riding surface, the reduction being achieved at predetermined points about the internal or external periphery of the retainer and over a predetermined portion of that peripheral surface. As a result of the reduction of clearance, oscillations of the retainer are reduced in magnitude as is the kinetic energy stored in the retainer while it is in oscillation. Oscillation is also suppressed to a considerable degree by reason of the lower damping ratio which results from the use of a clearance-reducing structure. For reasons which will become apparent from a reading of the following description of preferred embodiments of the invention, the gap-reducing mechanism of the invention is a plurality of lands formed upon the inner or outer peripheral surface of the retainer. These lands extend radially from the retainer and are most effective when they are three in number spaced equally and symmetrically about the retainer with their centers at 120° apart. Moreover, the angular width of each land should be such that it subtends an angle of less than 30°.

BRIEF DESCRIPTION OF THE DRAWING

In the drawing,

FIG. 1 is an elevation of a bearing system, partly in section, showing the relationship of rotating members and a ball-bearing retainer constructed in accordance with the present invention;

FIG. 2 is a cross-sectional view of the embodiment of FIG. 1 taken along the line 2—2;

FIG. 3 is a perspective view of the type of retainer utilized in the embodiment of FIG. 1; and FIG. 4 is a perspective view of an alternative retainer capable of use in the embodiment of FIG. 1

DESCRIPTION OF PREFERRED EMBODIMENT

The assembly shown in FIGS. 1 and 2 is somewhat schematic in nature, an inner member 12 and an outer member 14 being illustrated as inner and outer raceways. However, these members might equally well be simply two members of any description which are rotatable with respect to each other. The shape of the members or the fixing of one and the rotation of the other are of no significance. Of course, the outer surface of the inner member and the inner surface of the outer member must be coaxial and cylindrical, but no other limitations are significant in the practice of the invention.

The outer peripheral surface of the member 12 is provided with a shallow arcuate groove 16 and the inner peripheral surface of the member 14 is also provided with an arcuate groove 18. In the arcuate grooves, a plurality of balls 20 are disposed. The balls are held in position and separated one from another by a retainer 22 in which a number of equally spaced radial openings 26 are formed to serve as pockets for the balls.

Although the retainer may be of any of various basic known designs; for example, one-piece or separable, machined or stamped from pressed metal, the retainer shown in the drawing is preferably integrally formed from a plastic material such as that sold under the trade name SYNTHANE. The retainer, detached from the assembly of FIGS. 1 and 2, may be seen best in FIG. 3. In a typical structure, the outside diameter of the retainer is approximately 0.180 inches and the major inside diameter is approximately 0.130 inches. Six radial openings 26 equally spaced about the retainer serve as ball pockets 0.495 inches in diameter. Three lands 28 are formed on the inner peripheral surface of the retainer with their centers at points 120° apart. Each land 28 subtends an angle of less than 30° and the surfaces of the lands define a cylinder of diameter approximately 0.002 inches smaller than the major inner diameter of the retainer.

Reverting to the assembly illustrated in FIGS. 1 and 2, the gap between the outer diameter of the inner member 12 and the major inner diameter of the retainer 22 which may be defined as the major clearance is preferably of the order of 4 percent of the inner diameter of the retainer. The clearance between the arcuate surfaces of the lands 28 and the outer surface of the inner member 12 may range from approximately 0.0001 inches to 0.002 inches depending upon the application to which the bearing is put and the materials from which it is made.

In FIG. 4, and alternative design for the retainer is illustrated. In this instance, a retainer 32 includes radial openings 36 which serve as ball pockets and which are in all respects comparable to the openings 26 in the retainer 22. On the outer peripheral surface of the retainer 32 three symmetrically arranged lands 38 are formed. Again, the lands are preferably centered upon points 120° apart and each land 38 subtends an angle of less than 30°. The arcuate surfaces of the lands 38 define a cylinder having a diameter approximately two thousandths of an inch greater than the major outer diameter of the retainer 32. Clearance relationships between the major outer diameter of the retainer 32 and an outer member of the type shown in FIGS. 1 and 2 with which the retainer 32 is designed to be used are comparable to clearances between the retainer 22 and the inner member 12 described above.

Although such operation is not essential, generally a retainer, such as the retainer 22 of FIG. 3, is utilized when the outer member is rotating and the inner member is fixed. Conversely, a retainer such as the retainer 32 is used when the inner member is rotating and the outer member is fixed. In either case, however, the minimum angle between the edges of adjacent lands is 90°. This is of importance as explained below.

Studies have indicated that the stable mode of prior art retainers resembles the action of a hula hoop. That is, the clearance gap allows the mass of the retainer to be displaced from its nominal central position. A force is created which is equal to the angular velocity squared times the mass of the retainer at the displaced center which is highly undesirable. The reduced clearance gap of the system of the present invention reduces that force by the first power of the radius of de-centering.

In a system in which two such bearings are used, for example in the support for a gyroscope wheel, such forces as those described are not in phase because of inevitable slight differences in ball diameters, contact angles, and the like. The total result is a rotating vector sum at the difference frequency of the retainers which is reduced in the present invention by the reduction of each of the individual retainer forces.

Also, random variations of driving and driven forces cause the retainer to oscillate to the extent permitted by the clearance gaps. The reduced gap of the present invention reduces the magnitude of such oscillations with the result that there is less stored kinetic energy in the retainer while it is in oscillation.

Most important, squeal, which is the result of uncontrolled regenerative oscillation of the retainer, and which would be increased in intensity if the clearance gap were reduced about the entire periphery of the retainer, is reduced to a surprising degree by the three-land clearance gap reduction. It follows that power variations and total power consumption are also reduced. Bimoding is a phenomenon which occurs when average driving power abruptly changes from one value to another without apparent generation of oscillation. Such abrupt changes are believed to be due to a repositioning of the retainer and balls from one stable mode to another wherein lubrication and frictional coefficients differ and the present invention reduces the number of possible positional orientations from an infinite number to a number corresponding to the number of lands. As noted above, in the preferred construction, the number of lands is three, each having a width which subtends an angle of less than 30°. With only three possible positional orientations of the retainer the probability of bimoding is greatly reduced.

Lastly, wear and drag are reduced simply because the amount of de-centering is reduced. In a conventional retainer, wear is a direct function of force, the area rubbing, and the time of rubbing. In fact, in conventional retainers, the wear over a period of time is a cube function of angular velocity. Moreover, the elimination of squeal also reduces typical wear to a negligible amount. Of course, the reduction of wear gives a corresponding increase of life and the reduction of forces permits increases in speed and lessens demands for lubrication.

What is claimed is:

1. In an anti-friction ball-bearing system for facilitating the coaxial relative rotation of one member having at least an external cylindrical surface with respect to another member having at least an internal cylindrical surface, the combination of a generally cylindrical retainer disposed between and facing said internal and said external cylindrical surfaces rotatable relative thereto, a plurality of balls held in symmetrical array by said retainer between said cylindrical surfaces, said balls being of a predetermined diameter, and three lands formed upon and extending radially from points on said retainer between certain of said balls toward one of said cylindrical surfaces, the thickness of said retainer at said points at which said lands are formed being less than said predetermined diameter and spaced from said cylindrical surface.

2. In an anti-friction ball-bearing system as defined in claim 1, the combination wherein each said land being of a width subtending an angle of less than approximately 30°.

3. In an anti-friction system as defined in claim 2, the combination wherein the center point of each said land is spaced 120° from the center point of lands adjacent thereto.

4. In a ball-bearing retainer for insertion between first and second relatively rotating members having confronting coaxial cylindrical surfaces, said retainer having a generally cylindrical shape and having pockets formed therein to accommodate a plurality of balls, the improvement which comprises three lands formed upon said retainer and extending radially toward one of said confronting coaxial cylindrical surfaces, said lands being symmetrically disposed about the periphery of said retainer, the edges of adjacent lands being a minimum of 90° apart and the radial spacing between said lands and the cylindrical surface toward which they extend being approximately 0.0001 inches to 0.002 inch.

5. In a ball-bearing retainer as defined in claim 4, the combination in which said first member is an internal member having an outer cylindrical surface disposed coaxially within said retainer and said second member is an external member having an inner cylindrical surface disposed coaxially about said retainer, said lands being formed upon the outer periphery of said retainer and extending toward said inner cylindrical surface.

6. In a ball-bearing retainer as defined in claim 4, the combination of which said first member is an internal member having an outer cylindrical surface disposed coaxially within said retainer and said second member is an external member having an inner cylindrical surface disposed coaxially about said retainer, said lands being formed upon the inner periphery of said retainer and extending toward said outer cylindrical surface.

* * * * *

UNITED STATES PATENT OFFICE
CERTIFICATE OF CORRECTION

Patent No. 3,832,023          Dated August 27, 1974

Inventor(s) Winthrop H. Fairbank

It is certified that error appears in the above-identified patent and that said Letters Patent are hereby corrected as shown below:

IN ABSTRACT:

Change "Clearence" to -Clearance-.

IN SPECIFICATION:

Column 2, line 48, change "reatiner" to -retainer-.

IN CLAIMS:

Claim 1, line 15, add -and- between the words "surfaces" and "rotatable".

Claim 1, line 24, add -facing- before "cylindrical".

Claim 1, line 24, "surface" should be -surfaces-.

Claim 6, line 56, the word "of" should be -in-.

Signed and sealed this 29th day of October 1974.

(SEAL)
Attest:

McCOY M. GIBSON JR.
Attesting Officer

C. MARSHALL DANN
Commissioner of Patents